US012795729B2

(12) United States Patent
Calcev et al.

(10) Patent No.: US 12,795,729 B2
(45) Date of Patent: Nov. 10, 2026

(54) METHOD AND APPARATUS FOR UE INITIATED COT FOR MULTI-CHANNEL FRAME BASED EQUIPMENT

(71) Applicant: Huawei Technologies Co., Ltd., Shenzhen (CN)

(72) Inventors: George Calcev, Hoffman Estates, IL (US); Weimin Xiao, Hoffman Estates, IL (US); Brian Classon, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/659,730

(22) Filed: May 9, 2024

(65) Prior Publication Data

US 2024/0292460 A1 Aug. 29, 2024

Related U.S. Application Data

(63) Continuation of application No. PCT/US2022/048833, filed on Nov. 3, 2022.

(60) Provisional application No. 63/277,964, filed on Nov. 10, 2021.

(51) Int. Cl.
*H04W 74/0816* (2024.01)

(52) U.S. Cl.
CPC ............................... *H04W 74/0816* (2013.01)

(58) Field of Classification Search
CPC ...................... H04W 74/0816; H04W 74/0808
See application file for complete search history.

(56) References Cited

U.S. PATENT DOCUMENTS

| | | | | |
|---|---|---|---|---|
| 2021/0100030 | A1* | 4/2021 | Myung | H04W 74/0808 |
| 2024/0163867 | A1* | 5/2024 | Bagheri | H04W 72/1263 |
| 2024/0430040 | A1* | 12/2024 | Wang | H04L 1/1887 |

OTHER PUBLICATIONS

Le, Trung-Kien, Umer Salim, and Florian Kaltenberger. "An overview of physical layer design for ultra-reliable low-latency communications in 3GPP releases 15, 16, and 17." IEEE access 9 (2020): 433-444. (Year: 2020).*

ETRI, "Remaining issues on enhancements for unlicensed band", 3GPP TSG RAN WG1 #107-e, R1-2111989, Nov. 11-19, 2021, 7 Pages, e-Meeting.

Intel Corporation, "Enhancements to configured grants for NR-unlicensed", 3GPP TSG RAN WG1 Meeting #97, R1-1906788, May 13-17, 2019, 11 Pages, Reno, Nevada.

(Continued)

*Primary Examiner* — Sharad Rampuria
(74) *Attorney, Agent, or Firm* — Slater Matsil, LLP

(57) ABSTRACT

A user equipment (UE) may be configured/scheduled with uplink (UL) transmissions over multiple channels. Each UL transmission is aligned with a boundary of a UE fixed period frame (FFP). For each UL transmission, the UE may determine whether a gNB has initiated a channel occupancy time (COT) in a gNB FFP over a corresponding channel. If the COT is not initiated, the UE may initiate a COT in the UE FFP over the channel when the channel is available, by transmitting a corresponding UL transmission over the channel in the UE FFP. The UE may send, to the gNB, information indicating UE-initiated COT channel(s) of the multiple channels over which COT(s) have been initiated by the UE. The gNB may provide feedback for the UL transmissions based on the information.

18 Claims, 9 Drawing Sheets

(56) References Cited

OTHER PUBLICATIONS

VIVO, "Discussion on the channel access procedures", 3GPP TSG RAN WG1#96, R1-1901675, Feb. 25-Mar. 1, 2019, 9 Pages, Athens, Greece.
3GPP TS 38.213 V16.7.0 (Sep. 2021), 3rd Generation Partnership Project; Technical Specification Group Radio Access Network; NR; Physical layer procedures for control(Release 16), total 188 pages.

* cited by examiner

METHOD AND APPARATUS FOR UE INITIATED COT FOR MULTI-CHANNEL FRAME BASED EQUIPMENT

CROSS-REFERENCE TO RELATED APPLICATIONS

This application is a continuation of PCT/US2022/048833, filed on Nov. 3, 2022, and entitled "Method and Apparatus for UE Initiated COT for Multi-Channel Frame Based Equipment," which claims the benefit of U.S. Provisional Application No. 63/277,964, filed on Nov. 10, 2021, and entitled "UE initiated COT for Multi-channel Frame Based Equipment," which applications are hereby incorporated herein by reference.

TECHNICAL FIELD

The present disclosure relates generally to wireless communications, and in particular embodiments, to techniques and mechanisms for UE initiated channel occupancy time (COT) for Multi-channel Frame Based Equipment.

BACKGROUND

Licensed exempt spectrum, also known as unlicensed spectrum or shared spectrum, has recently attracted a lot of interest from cellular operators. Long Term Evolution licensed assisted access (LTE-LAA) was specified in 3GPP LTE releases (Rels) 13 and 14. More recently in New Radio Unlicensed (NR-U), the operation in unlicensed spectrum (or shared spectrum) was specified in release 16 (3GPP TS 37.213, which is hereby incorporated herein by reference in its entirety) for 3GPP New Radio (NR).

3GPP and IEEE technologies operating in unlicensed spectrum use listen before talk (LBT) channel access. In certain regions, such as European Union (EU) and Japan, a LBT rule is generally enforced by spectrum regulators to reduce interference risks and to offer a fairer coexistence mechanism. The LBT mechanism requires a transmitter to check, before a transmission, if there are other occupants of a channel and postpone the transmission if the channel is occupied.

In particular, the LBT rule in EU, specified in European Telecommunications Standards Institute (ETSI) European Standard (EN) 301 893 for 5 GHz band, uses clear channel assessment (CCA) to determine if a channel is available for transmission. CCA checks if energy received on a channel is above a CCA threshold. If the energy detected exceeds a CCA threshold, the channel is considered in use (busy), otherwise, the channel is considered idle. If the channel is idle, a transmitter can transmit for a duration of a channel occupancy time (COT) in a bandwidth that is at least a portion, e.g., 80%, of a total channel bandwidth. The maximum COT duration for a transmission burst is also specified in ETSI EN 301 893 V2.1.1 (2017 May), which is hereby incorporated herein by reference in its entirety. The maximum COT (MCOT) duration adopted in 3GPP NR-U Rel 16 (TS 37.213, which is hereby incorporated herein by reference in its entirety) is a function of a channel access priority class (CAPC). As defined in TS 37.213, for determining a COT, if a transmission gap (an interval between consecutive transmissions) is less than or equal to 25 us (microseconds), the transmission gap duration is counted in the COT. A transmission burst is defined as a set of transmissions with gaps (i.e., transmission gaps) no more than 16 us, and if the gaps are greater than 16 us, the set of transmissions are considered separate.

3GPP Rel 16 (TS 37.213) defines several types of channel access in unlicensed spectrum, for downlink (DL) and uplink (UL).

- In Type 1 DL channel access, a gNB may transmit after first sensing a channel to be idle during sensing slot durations of a defer duration $T_d$ and after a randomly initiated counter N, which is decremented in each idle sensing slot, is zero. A sensing slot duration is 9 us. Type 1 DL channel access is used before starting a new COT, where the COT duration can be up to 10 ms depending on traffic priority.
- Type 2 DL channel access includes a deterministic duration of channel sensing, during which a channel needs to be sensed as idle. Type 2 DL channel access includes Type 2A, Type 2B and Type 2C channel accesses:
- Type 2A channel access allows a transmission if the channel is sensed idle for at least a sensing interval of 25 us prior to transmission.
- Type 2B channel access allows a transmission if the channel is sensed idle for at least a sensing interval of 16 us prior to transmission.
- Type 2C channel access allows a transmission for a duration of no more than 584 us without channel sensing prior to transmission.
- Type 2A DL channel access procedures are applicable in shared COT following a user equipment (UE) transmission, and for transmissions that includes a discovery burst with a duration of at most 1 ms and a duty cycle at most 1/20.
- Type 2B or Type 2C DL channel access procedures are applicable following transmission(s) by a UE after a gap of 16 us or up to 16 us, respectively, in a shared channel occupancy.

Similarly to the DL channel access types, TS 37.213 defines UL channel access procedures, where Type 1 UL channel access is based on sensing channel being idle for a fixed defer duration (Td) and then until a random backoff counter N decremented for each idle sensing slot reaches zero, as in Type 1 DL channel access. Type 2 UL channel access requires that the channel to be sensed as idle for a fixed (deterministic) duration before transmissions, where Type 2A UL channel access requires at least a 25 us channel idle duration before transmission, and Type 2B UL channel access requires at least a 16 us of channel idle duration before transmissions. Type 2C allows for transmissions of at most 584 us length without any channel sensing.

SUMMARY

Technical advantages are generally achieved, by embodiments of this disclosure which describe method and apparatus for UE initiated channel occupancy time (COT) for Multi-channel Frame Based Equipment (FBE).

According to one aspect of the present disclosure, a method is provided that includes: for each uplink (UL) transmission of a plurality of UL transmissions over a plurality of channels, with each of the plurality of UL transmissions being aligned with a starting boundary of a fixed period frame (FFP) of a user equipment (UE) in a time domain over a corresponding channel, determining, by the UE for a first UL transmission of the plurality of UL transmissions over a first channel of the plurality of channels, whether a gNB has initiated a first channel occupancy time (COT) in a gNB FFP over the first channel, with the first COT corresponding to the first UL transmission; and upon determining that the gNB has not initiated the first COT over the first channel, initiating, by the UE when the first channel is available, a second COT over the first channel in the FFP of the UE by transmitting the first UL transmission over the first channel in the FFP of the UE, the first UL transmission starting at beginning of the FFP of the UE and ending before an idle period within the FFP of the UE.

Optionally, in any of the preceding aspects, the method further includes: when the first COT over the first channel has not been initiated by the gNB, performing, by the UE before initiating the second COT, a clear channel assessment (CCA) to determine whether the first channel is available.

Optionally, in any of the preceding aspects, the CCA is perform over a listen-before-talk (LBT) bandwidth covering the plurality of channels.

Optionally, in any of the preceding aspects, the CCA is perform over a listen-before-talk (LBT) bandwidth covering the first channel and a guard band.

Optionally, in any of the preceding aspects, the plurality of channels comprises two channels consecutive in a frequency domain.

Optionally, in any of the preceding aspects, the plurality of channels comprises two channels non-consecutive in a frequency domain, with a guard band in between the two channels.

Optionally, in any of the preceding aspects, the method further includes: when the first COT over the first channel has been initiated by the gNB, transmitting, by the UE, the UL transmission during the first COT of the gNB over the first channel.

Optionally, in any of the preceding aspects, the plurality of UL transmissions are configured grant Type 1 UL transmissions or configured grant Type 2 UL transmissions.

Optionally, in any of the preceding aspects, the plurality of UL transmissions are scheduled dynamically for the UE.

Optionally, in any of the preceding aspects, the method further includes: transmitting, by the UE when the second COT over the first channel is initiated by the UE, an indication indicating that the first UL transmission is transmitted over the first channel using a UE initiated COT.

Optionally, in any of the preceding aspects, the method further includes: adding, by the UE, the indication in the first UL transmission.

Optionally, in any of the preceding aspects, the method further includes: receiving, by the UE, signalling indicating that the UE is allowed to initiate COTs for UL transmissions over the plurality of channels.

Optionally, in any of the preceding aspects, the method further includes: receiving, by the UE from the gNB, an acknowledgement/negative acknowledgement (ACK/NACK) message corresponding to the first UL transmission transmitted over the first channel during the second COT of the UE.

Optionally, in any of the preceding aspects, the method further includes: transmitting, by the UE, information of a list of channels of the plurality of channels over which UL transmission(s) of the plurality of UL transmissions have been transmitted using UE initiated COTs.

Optionally, in any of the preceding aspects, the method further includes: receiving, by the UE from the gNB, a request requesting report of channels over which UE COTs have been initiated by the UE for UL transmissions.

Optionally, in any of the preceding aspects, the method further includes: receiving, by the UE from the gNB, an indication indicating whether feedback is to be provided for an UL transmission transmitted using a UE initiated COT.

According to another aspect of the present disclosure, a method is provided that includes: receiving, by a gNB from a user equipment (UE), one or more UL transmissions of a plurality of UL transmissions, the plurality of UL transmissions being configured or scheduled over a plurality of channels, each of the plurality of UL transmissions being aligned with a starting boundary of a fixed period frame (FFP) of the UE over a channel, and at least one UL transmission of the one or more UL transmissions being received in a UE initiated channel occupancy time (COT) over a corresponding channel; determining, by the gNB, whether information has been received from the UE indicating one or more UE-initiated COT channels of the plurality of channels, the one or more UE-initiated COT channels being channels over which COT(s) have been initiated by the UE; in response to the information having been received from the UE, generating, by the gNB based on the information and the received one or more UL transmissions, feedback information for first UL transmission(s) over the one or more UE-initiated COT channels and for second UL transmission(s) over one or more gNB-initiated COT channels of the plurality of channels, the one or more gNB-initiated COT channels being channels over which COT(s) have been initiated by the gNB, and the feedback information indicating whether the first UL transmission(s) and the second UL transmission(s) are successfully received by the gNB; or in response to the information not received, generating, by the gNB based on the received one or more transmissions, feedback information for the second UL transmission(s) over the one or more gNB-initiated COT channels and the at least one UL transmission.

Optionally, in any of the preceding aspects, the plurality of UL transmissions are configured grant Type 1 UL transmissions or configured grant Type 2 UL transmissions.

Optionally, in any of the preceding aspects, the plurality of UL transmissions are dynamically scheduled for the UE.

Optionally, in any of the preceding aspects, the method further includes: determining, by the gNB, whether to generate feedback information for UL transmissions of UE-initiated COT channels, the UE-initiated COT channels being channels over which UE COTs are initiated over the channels.

Optionally, in any of the preceding aspects, the method further includes: when determining not to generate the feedback information for UL transmissions of UE-initiated COT channels, generating, by the gNB, only the feedback information for the second UL transmission(s) over the one or more gNB-initiated COT channels of the plurality of channels.

Optionally, in any of the preceding aspects, the at least one UL transmission comprises an indication indicating that the at least one UL transmission is transmitted over a first channel in the UE initiated COT.

Optionally, in any of the preceding aspects, the method further includes: transmitting, by the gNB to the UE, signalling indicating whether the UE is allowed to initiate a COT for UL transmissions over a channel of the plurality of channels.

Optionally, in any of the preceding aspects, the method further includes: receiving, by the gNB from the UE, the information.

Optionally, in any of the preceding aspects, the information is comprised in a UL transmission of the one or more UL transmissions.

Optionally, in any of the preceding aspects, the method further includes: transmitting, by the gNB to the UE, a request requesting the UE to report a list of channels over which UE initiated COT(s) have been used by the UE for UL transmission(s).

Optionally, in any of the preceding aspects, the method further includes: transmitting, by the gNB to the UE, an indication indicating whether feedback is to be provided to the UE for an UL transmission transmitted using a UE initiated COT.

According to another aspect of the present disclosure, an apparatus is provided that includes: a non-transitory memory storage comprising instructions; and one or more processors in communication with the memory storage, wherein the instructions, when executed by the one or more processors, cause the apparatus to perform a method in any one of the preceding aspects.

According to another aspect of the present disclosure, a non-transitory computer-readable media storing computer instructions is provided, the instructions, when executed by one or more processors, cause the one or more processors to perform a method in any of the preceding aspects.

According to another aspect of the present disclosure, a system is provided that includes a gNB and a user equipment (UE) in communication with the gNB. The UE is configured to perform: for each uplink (UL) transmission of a plurality of UL transmissions over a plurality of channels, with each of the plurality of UL transmissions being aligned with a starting boundary of a fixed period frame (FFP) of a user equipment (UE) in a time domain over a corresponding channel, determining, for a first UL transmission of the plurality of UL transmissions over a first channel of the plurality of channels, whether the gNB has initiated a first channel occupancy time (COT) in a gNB FFP over the first channel, with the first COT corresponding to the first UL transmission; and upon determining that the gNB has not initiated the first COT over the first channel, initiating, when the first channel is available, a second COT over the first channel in the FFP of the UE by transmitting the first UL transmission over the first channel in the FFP of the UE, the first UL transmission starting at beginning of the FFP of the UE and ending before an idle period within the FFP of the UE. The gNB is configured to perform: receiving, from the UE, one or more UL transmissions of the plurality of UL transmissions, at least one UL transmission of the one or more UL transmissions being received in a UE initiated COT over a corresponding channel; determining whether information has been received from the UE indicating one or more UE-initiated COT channels of the plurality of channels, the one or more UE-initiated COT channels being channels over which COT(s) have been initiated by the UE; in response to the information having been received from the UE, generating, based on the information and the received one or more UL transmissions, feedback information for first UL transmission(s) over the one or more UE-initiated COT channels and for second UL transmission(s) over one or more gNB-initiated COT channels of the plurality of channels, the one or more gNB-initiated COT channels being channels over which COT(s) have been initiated by the gNB, and the feedback information indicating whether the first UL transmission(s) and the second UL transmission(s) are successfully received by the gNB; or in response to the information not received, generating, based on the received one or more transmissions, feedback information for the second UL transmission(s) over the one or more gNB-initiated COT channels and the at least one UL transmission.

According to another aspect of the present disclosure, an apparatus is provided that includes: for each uplink (UL) transmission of a plurality of UL transmissions over a plurality of channels, with each of the plurality of UL transmissions being aligned with a starting boundary of a fixed period frame (FFP) of a user equipment (UE) in a time domain over a corresponding channel, a first module configured to determine, for a first UL transmission of the plurality of UL transmissions over a first channel of the plurality of channels, whether a gNB has initiated a first channel occupancy time (COT) in a gNB FFP over the first channel, with the first COT corresponding to the first UL transmission; and a second module configured to, upon determining, by the first module, that the gNB has not initiated the first COT over the first channel, initiate, when the first channel is available, a second COT over the first channel in the FFP of the UE by transmitting the first UL transmission over the first channel in the FFP of the UE, the first UL transmission starting at beginning of the FFP of the UE and ending before an idle period within the FFP of the UE.

According to another aspect of the present disclosure, an apparatus is provided that includes: a receiving module configured to: receive, from a user equipment (UE), one or more UL transmissions of a plurality of UL transmissions, the plurality of UL transmissions being configured or scheduled over a plurality of channels, each of the plurality of UL transmissions being aligned with a starting boundary of a fixed period frame (FFP) of the UE over a channel, and at least one UL transmission of the one or more UL transmissions being received in a UE initiated channel occupancy time (COT) over a corresponding channel; a determining module configured to: determine whether information has been received from the UE indicating one or more UE-initiated COT channels of the plurality of channels, the one or more UE-initiated COT channels being channels over which COT(s) have been initiated by the UE; and a generating module configured to: in response to the information having been received from the UE, generate, based on the information and the received one or more UL transmissions, feedback information for first UL transmission(s) over the one or more UE-initiated COT channels and for second UL transmission(s) over one or more gNB-initiated COT channels of the plurality of channels, the one or more gNB-initiated COT channels being channels over which COT(s) have been initiated by the gNB, and the feedback information indicating whether the first UL transmission(s) and the second UL transmission(s) are successfully received by the gNB; or in response to the information not received, generate, based on the received one or more transmissions, feedback information for the second UL transmission(s) over the one or more gNB-initiated COT channels and the at least one UL transmission.

Embodiments of the present disclosure facilitate UL transmissions where a contention-based protocol (CBP) (e.g., listen-before-talk (LBT)) is used, e.g., UL transmissions over unlicensed spectrum, facilitate ultra-reliable and low latency communication (URLLC) and improve UL transmission performance.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
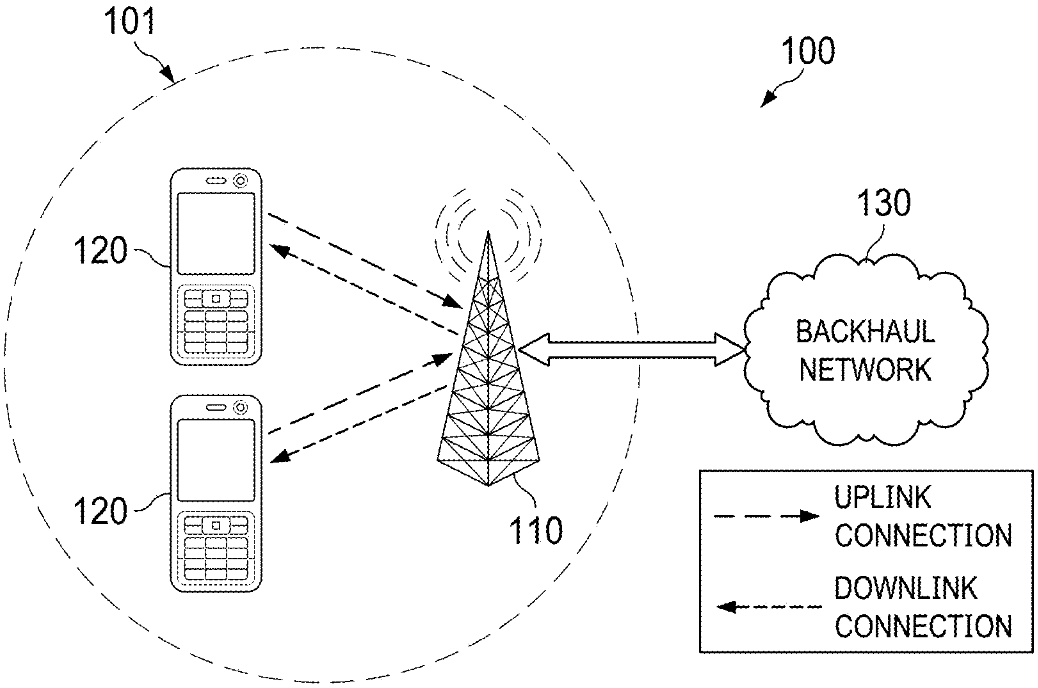
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide a method and apparatus for uplink (UL) transmissions over wideband or multiple channels (carriers) in a frame based equipment (FBE) operation mode, using UE-initiated COT(s) and/or gNB-initiated COT(s). The UL transmissions may be configured grant UL transmissions or dynamically scheduled UL transmissions.

In some embodiments, a user equipment (UE) may be configured/scheduled with UL transmissions over multiple channels. Each UL transmission is aligned with a boundary of a UE fixed period frame (FFP). For each UL transmission over a channel, the UE may determine whether a gNB has initiated a channel occupancy time (COT) in a gNB FFP over the channel. If the gNB has not initiated the COT in the gNB FFP over the channel, and when the channel is available, the UE may initiate a COT in the UE FFP over the channel by transmitting a corresponding UL transmission over the channel in the UE FFP. The corresponding UL transmission starts at beginning of the UE FFP and ends before an idle period within the UE FFP.

In some embodiments, the UE may send, to the gNB, information indicating UE-initiated COT channel(s) over which COT(s) have been initiated by the UE for the configured/scheduled UL transmissions. The gNB may provide feedback to the UE for the UL transmissions based on the information.

In some embodiments, the gNB may receive one or more UL transmissions of the configured/scheduled UL transmissions. At least one UL transmission of the one or more UL transmissions may be received in a UE initiated COT over a corresponding channel. The gNB may determine whether the information has been received from the UE. When the information has been received, the gNB may generate, based on the information and the received one or more UL transmissions, feedback information for first UL transmission(s) over the UE-initiated COT channel(s) indicated by the information and for second UL transmission(s) over gNB-initiated COT channel(s). When no information is received, the gNB may generate, based on the received one or more UL transmissions, feedback information for the second UL transmission(s) over the gNB-initiated COT channel(s) and for the at least one UL transmission received in the UE initiated COT.

Embodiments of the present disclosure facilitate UL transmissions where listen-before-talk (LBT) mechanism is used, e.g., UL transmissions over unlicensed spectrum, facilitate ultra-reliable and low latency communication (URLLC) and improve UL transmission performance.

FIG. 1 is a diagram of an embodiment network 100 for wireless communications. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an Node B, evolved Node B (eNB), next generation (NG) Node B (gNB), master eNB (MeNB), secondary eNB (SeNB), master gNB (MgNB), secondary gNB (SgNB), network controller, control node, access point, access node, transmission point (TP), transmission-reception point (TRP), cell, carrier, macro cell, femtocell, pico cell, relay, and so on. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), mobile station, mobile, terminal, terminal device, user, subscriber, station, communication device, customer premises equipment (CPE), relay, Integrated Access and Backhaul (IAB) relay, and so on. In some embodiments, the network 100 may comprise various other wireless devices, such as relays, low power nodes, etc. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

On unlicensed spectrums, there is generally no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as:

"A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel."

The state of a channel being busy may also be called as channel unavailable, channel not clear, channel being occupied, etc., and the state of a channel being idle may also be called as channel available, channel clear, channel not occupied, etc.

One example of CBP is the "listen before talk" (LBT) operating procedure in IEEE 802.11 or Wi-Fi (which can be found in, e.g., "Wireless LAN medium access control (MAC) and physical layer (PHY) specifications," IEEE Std. 802.11-2007 (Revision of IEEE Std. 802.11-1999), which is hereby incorporated herein by reference in its entirety). One way to implement Listen Before Talk (LBT) is using the carrier sense multiple access with collision avoidance (CSMA/CA) protocol. According to the CSMA/CA protocol, carrier sensing is performed before any transmission attempt, and a transmission is performed only if a carrier is sensed to be idle, otherwise, if the carrier is busy, a random backoff time for the next sensing is applied. The carrier sensing is generally done through a clear channel assessment (CCA) procedure to determine if the in-channel power is below a given threshold.

ETSI EN 301893 V2.1.1 (which is hereby incorporated herein by reference in its entirety), Clause 4.9.2, describes two types of Adaptive equipment: Frame Based Equipment (FBE) and Load Based Equipment (LBE). For FBE, the following is specified (quoted from ETSI EN 301 893 V2.1.1, Clause 4.9.2).

"Frame Based Equipment shall comply with the following requirements:

1) Before starting transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the Operating Channel(s) to be clear, it may transmit immediately (see point 3 below).
2) If the equipment finds an Operating Channel occupied, it shall not transmit on that channel during the next Fixed Frame Period.

NOTE 1: The equipment is allowed to continue Short Control Signaling Transmissions on this channel providing it complies with the requirements in clause 4.9.2.3.

NOTE 2: For equipment having simultaneous transmissions on multiple (adjacent or non-adjacent) Operating Channels, the equipment is allowed to continue transmissions on other Operating Channels providing the CCA check did not detect any signals on those channels.

3) The total time during which an equipment has transmissions on a given channel without re-evaluating the availability of that channel, is defined as the Channel Occupancy Time. The Channel Occupancy Time shall be in the range 1 ms to 10 ms and the minimum Idle Period shall be at least 5% of the Channel Occupancy Time used by the equipment for the current Fixed Frame Period. Towards the end of the Idle Period, the equipment shall perform a new CCA as described in point 1 above.
4) The equipment, upon correct reception of a packet which was intended for this equipment, can skip CCA and immediately (see note 3) proceed with the transmission of management and control frames (e.g. ACK and Block ACK frames). A consecutive sequence of such transmissions by the equipment, without it performing a new CCA, shall not exceed the Maximum Channel Occupancy Time as defined in point 3 above.

NOTE 3: For the purpose of multi-cast, the ACK transmissions (associated with the same data packet) of the individual devices are allowed to take place in a sequence.

5) The energy detection threshold for the CCA shall be proportional to the maximum transmit power (PH) of the transmitter: for a 23 dBm effective isotropically radiated power (e.i.r.p.) transmitter, the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 (zero) dBi receive antenna and PH specified in dBm e.i.r.p.)."

The existing specifications of TS 37.213 define multi-channel access:

4.3.3 Channel access procedures for transmission(s) on multiple channels If a gNB/UE intends to transmit on a set of channels C a scheduled or a configured UL transmission that starts at the same time on the set of channels C, the gNB/UE shall perform channel access on each channel $c_i \in C$, according to the procedures described in clause 4.3.1 to 4.3.3 when applicable. The following are applicable for a UL transmission on a channel within the bandwidth of a carrier:

The UE may not transmit on channel $c_i \in C$ within the bandwidth of a carrier, if the UE fails to access any of the channels, of the carrier bandwidth, on which the UE is scheduled or configured by UL resources.

The UE may not transmit on a channel within the bandwidth of a carrier if the UE is configured without intra-cell guard band(s) on a UL bandwidthpart as described in clause 7 in [8] and if the UE fails to access any of the channels of the UL bandwidthpart.

Based on the actual design, the UE may start a transmission over multiple channels provided that clear channel access or a LBT procedure is performed in each channel. The channels where such transmission is performed may be non-contiguous as the result of the LBT procedure.

Communications in unlicensed spectrum use LBT channel access. A transmitter performs CCA to determine if a channel is available for transmission. If the channel is assessed as available, the transmitter can transmit in a duration of a channel occupancy time (COT). A COT is a time duration during which a communication device, e.g., a user equipment (UE) or a gNB, can have transmissions on a given channel without re-evaluating the availability of that channel. During the COT, the communication device may have multiple transmissions, and may allow other communication devices to share the COT (i.e., to transmit during the shared COT).

Figure 2:
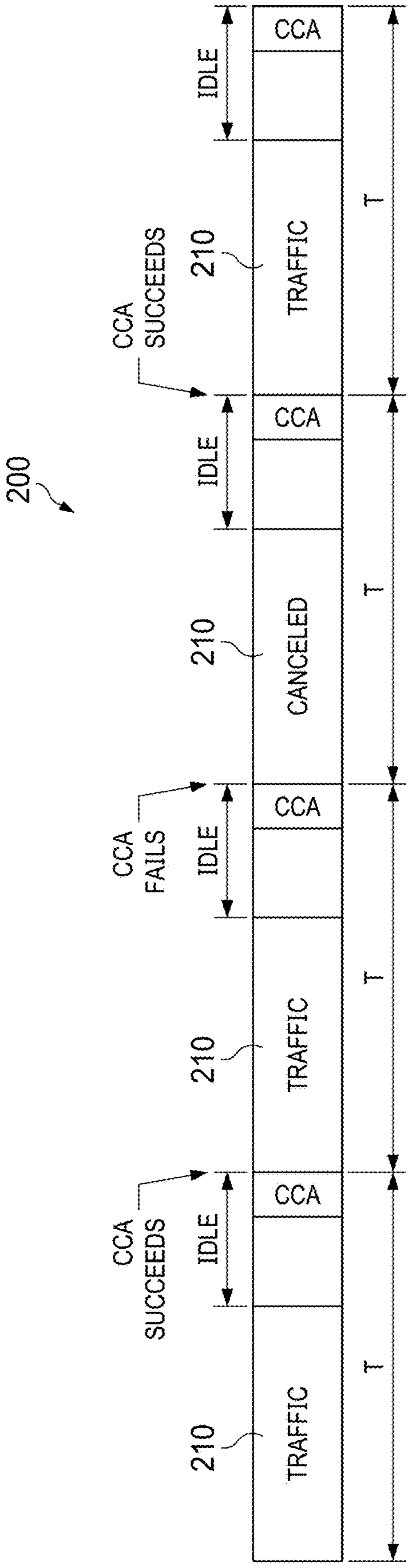
FIG. 2 is a diagram of operation timing for uplink (UL) transmissions in a FBE mode according to TS 37.213.

FIG. 2 is a diagram 200 of operation timing in a FBE mode according to TS 37.213. In the FBE mode of operation, a gNB executes a LBT operation (e.g., an extended CCA) every fixed frame period (FFP) (i.e., a time interval/period T) on a channel, e.g., during an idle period. If the channel is found idle according to the LBT operation, the gNB may initiate a COT 210 of a duration Ty, which is a fraction of the repetition period T. That is, the gNB is the one who first starts using the COT for transmission. The COT 210 is initiated periodically FFP (or T) in two consecutive radio frames, starting from an even indexed radio frame at x·T, with a maximum channel occupancy time Ty=0.95*T, where T is the FFP in ms, which is also known as a frame and is a higher layer parameter, and x is an integer representing the period number (i.e., FFP number). This type of access is referred to as the semi-static channel occupancy in TS 37.213. As shown in FIG. 2, each FFP includes a COT 210 starting at the beginning of the FFP and followed by an idle period. The gNB performs CCA in the idle period of the current FFP before the next FFP starts. If the channel is found available (not occupied, or clear) based on the CCA, the gNB may initiate a COT 210 in the next FFP. If the channel is found available occupied, the gNB may skip the next FFP, without performing any transmission in the next FFP, i.e., the COT in the next FFP is cancelled.

In the FBE mode of operation, a UE is provided information about the FFP by the gNB, such as starting positions of the FFP and time duration of the FFP. UE transmissions within the FFP can occur if one or more DL signals/channels, (e.g., a physical downlink control channel (PDCCH), a synchronization signal block (SSB), a physical broadcast channel (PBCH), remaining minimum system information (RMSI), or a configured grant (CG)-PDCCH) within the FFP are detected.

Conventionally, in the FBE mode, only a gNB can initiate a COT (i.e., the gNB is the one that first transmit in the COT), and the gNB may share the COT with UEs. A UE in the FBE operation mode cannot initiate a COT, and needs to use a COT that is shared by a gNB for transmissions. The gNB may schedule an uplink grant in the gNB-initiated COT for uplink transmissions of the UE.

The restriction that only gNB can initiate a COT can lead to unnecessary delays and overhead for UL transmissions of UEs. When a UE has no data transmission, the UE may still need to monitor each scheduled COT, which leads to UE battery power waste.

The more recent work in 3GPP Rel 17 defines conditions for UE transmission for frame based equipment (FBE) mode, where a UE may initiate a COT and gNB may share a UE initiated COT. A UE may initiate a COT on a channel at the beginning of a FFP (a time interval T), when the UE senses the channel as idle prior to the FFP starts. The COT is initiated by a UE UL transmission performed at the beginning of the FFP, and ends before the idle period of the FFP starts. That is, the UE may initiate the COT of the FFP by transmitting a UL transmission, with the UL transmission starting at the beginning of the FFP. The UL transmission may be referred to as a COT initiating transmission. Transmitting a UL transmission at the beginning of the FFP initiates the COT of the FFP. The gNB, which receives the UL transmission from the UE, may determine, based on receipt of the UL transmission, that the UE has initiated the COT. If the channel is found busy, the UE skips that FFP until the next FFP.

UL transmissions of a UE may be dynamically scheduled or configured, as specified in TS 38.214 (e.g., refer to TS 38.214, V17.1.0 (2022 March), for the definition of resource allocation (dynamic and configured grant)), which is hereby incorporated herein by reference in its entirety:

> "PUSCH transmission(s) can be dynamically scheduled by an UL grant in a DCL, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to Clause 10.2 of [6, TS 38.213] after the reception of higher layer parameter configuredGrant-Config not including rrc-ConfiguredUplinkGrant."

The configured grant Type 1 PUSCH transmission and the configured grant Type 2 PUSCH transmission may also be generally referred to as "configured UL transmission", "transmission based on a configured grant", "configured grant UL transmission", or "Type 1/2 transmission" in the present disclosure, unless otherwise provided. These terms are used interchangeably in the present disclosure. A UL transmission, configured or scheduled, may coincide with the start of a UE FFP. That is, the UL transmission may be aligned, in the time domain, with the starting position of the UE FFP (or UE FFP boundary). An issue in this case is that the UE needs to decide whether it needs to initiate a COT to perform a UL transmission, or perform the UL transmission in an ongoing gNB COT when the gNB initiated the COT.

Figure 3:
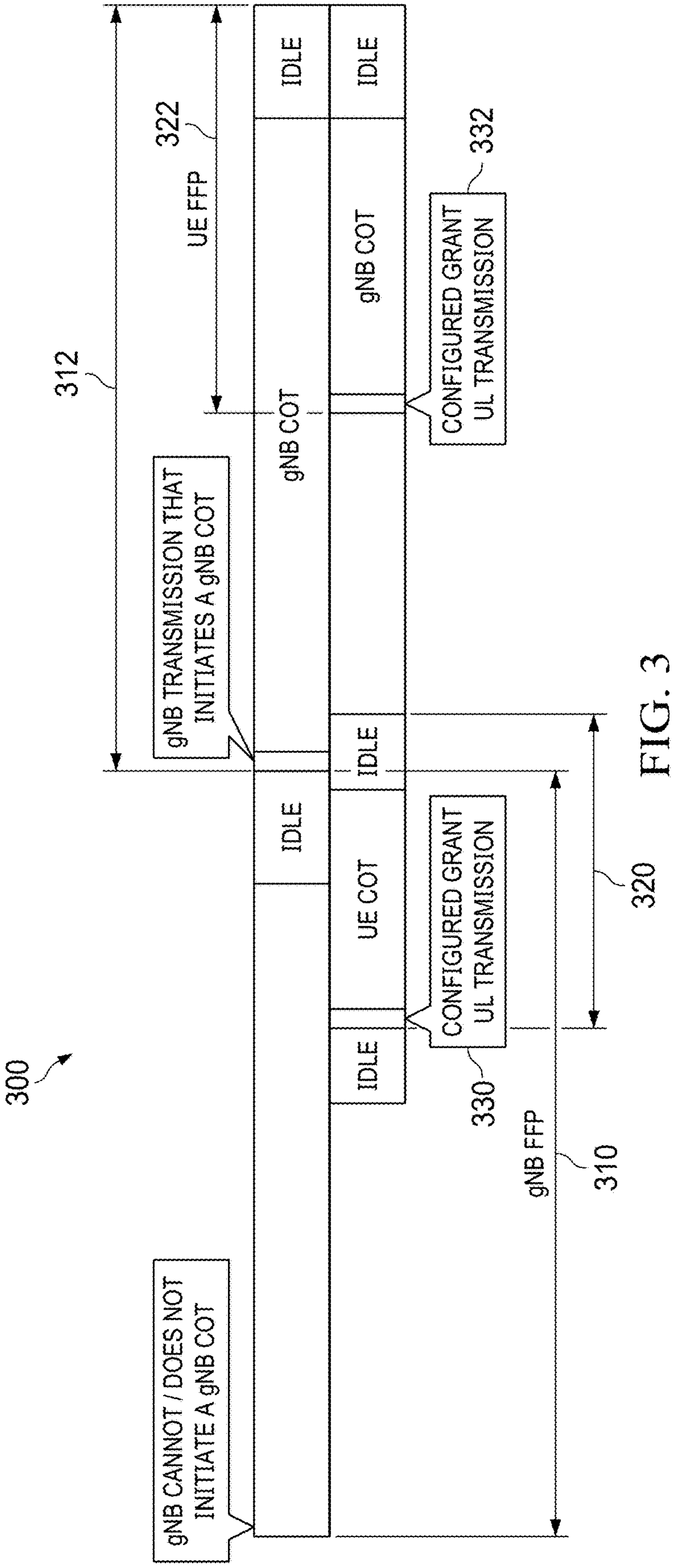
FIG. 3 is a diagram of example operation timing for uplink transmissions based on the RAN1 #106bis agreements.

The RAN1 #106bis (October 2021) agreements (which is hereby incorporated herein by reference in its entirety) define the rules of UE operations for such situation, as specified in the following:

> In semi-static channel access mode when a UE can operate as UE-initiated COT, UE determines whether a configured UL transmission that is aligned with a UE FFP boundary and ends before the idle period of that UE FFP based on UE-initiated COT or sharing a gNB-initiated COT:
>
> If the transmission is confined within a gNB FFP before the idle period of that gNB FFP, and the UE has already determined that gNB is initiated that gNB FFP, UE assumes that the configured UL transmission corresponds to gNB-initiated COT. Otherwise, UE assumes that the configured UL transmission corresponds to UE-initiated COT FIG. 3 is a diagram 300 of example operation timing based on the above rules. FIG. 3 shows gNB FFPs 310 and 312, and UE FFPs 320 and 322. A UL transmission 330 (e.g., a configured grant UL transmission) is aligned with the starting boundary of the UE FFP 320. A UL transmission 332 (e.g., a configured grant UL transmission) is aligned with the starting boundary of the UE FFP 322. In this example, the gNB does not initiate a gNB COT in the gNB FFP 310 (e.g., when the gNB senses that the channel is busy). Based on the rules, the UE may initiate a UE COT in the UE FFP 320 for transmitting the UL transmission 330. The UE may initiate the UE COT in the UE FFP 320 by transmitting, when the channel is available, the configured grant UL transmission 330 at the beginning of the UE FFP 320. If the channel is busy, then the UE does not initiate the UE COT and the UL transmission 330 is not performed. The gNB initiates a gNB COT in the gNB FFP 312 (e.g., by transmitting a DL transmission), and the UL transmission 332 is within the gNB COT. In this case, based on the rules, the UE transmits the UL transmission 332 using the on-going gNB COT in the gNB FFP 312, and the UE does not initiate a UE COT in the UE FFP 322.

However, there is no solution defined for UE operations when a UE is configured with configured grant UL transmissions over multiple channels.

Embodiments of the present disclosure provide a method for UL transmissions over wideband (for instance covered by multiple LBT BWs) or multiple channels (or carriers) in the FBE operation mode, using a UE-initiated COT(s) or a gNB-initiated COT(s). The UL transmissions may be configured grant UL transmissions or dynamically scheduled UL transmissions. In the following descriptions and embodiments, configured grant UL transmissions are used as illustrative examples. The channels in the following descriptions may be referred to as "configured grant channels". The embodiments may also be applied to dynamically scheduled UL transmissions (e.g., scheduled via DCI).

Each of the configured grant UL transmissions is aligned with the start (the beginning, or the starting boundary) of a UE FFP over a corresponding channel, and ends before the idle period of the UE FFP. For example, a UE is configured with N UL transmissions (e.g., configured grant Type 1 or Type 2 UL transmissions) over N respective channels. N is an integer greater than 1. Each of the N UL transmissions over a channel is aligned with (also referred to as "coincide with") the starting boundary of a FFP of the UE over the channel. That is, the time-domain resource configured/allocated for each of the N UL transmissions over a respective channel starts at the same time as the UE FFP over the respective channel starts. In other words, the starting position of the time-domain resource aligns with the starting position of the UE FFP in the time domain. The time-domain resource is within a region of the UE FFP before the idle period of the UE FFP. Embodiments of the present disclosure may be viewed as the extension of configured grant for multiple channels and COT determination. In an example, UE FFPs over the N channels may be aligned in the time domain. These UE FFPs may have the same configuration, e.g., starting position, FFP length, COT length, idle period, and so on. For each channel, the UE needs to determine that the channel is idle before initiating a COT over the channel.

In some embodiments, when a UE is configured with configured grant UL transmissions over multiple channels, and these configured grant UL transmissions are aligned with the starting boundaries of respective UE FFPs over the multiple channels, the UE may determine, before a UE FFP of each channel starts, whether a gNB has initiated a COT (gNB-initiated COT) over the channel, with the gNB initiated COT containing, in the time domain, the corresponding configured grant UL transmission over the channel. For example, the UE may determine whether the gNB has initiated a COT over a channel by detecting whether it receives a DL transmission that is sent by the gNB at the beginning of a FFP of the gNB over the channel. If the UE receives the DL transmission, the UE determines that the gNB has initiated the COT in the gNB FFP over the channel. If the UE does not receive the DL transmission, the UE determines that the gNB has not initiated the COT in the gNB FFP over the channel.

If there is no gNB-initiated COT in any of these channels, the UE may sense availability of each channel and determine whether it can initiate a COT over each channel. As an example, the UE may perform CCA over each channel in the idle period of a preceding UE FFP of the UE FFP of each channel. The UE may initiate COT(s) in one or more channels sensed idle, by transmitting the corresponding configured grant UL transmission(s) at the beginning of the corresponding UE FFP(s) of the one or more channels sensed idle. The corresponding configured grant UL transmission(s) may be called COT initiating transmissions. The gNB may determine that the UE has initiated COT(s) in one, or more or all of the channels, e.g., based on receipt of the configured grant UL transmission(s) transmitted by the UE in the corresponding UE FFP(s), and may perform DL transmission(s) by sharing the UE-initiated COT(s), without transmitting during the idle period(s) of the UE FFP(s). In this example, the UE only have transmission(s) in the UE-initiated COT(s). If a channel is sensed busy, the UE does not initiate a COT in the UE FFP, and a corresponding UL transmission (aligned with the UE FFP) is not transmitted.

In some embodiments, if the UE determines that the gNB has initiated COT(s) over one or more of the channels, the UE may transmit, over the one or more of the channels, by sharing the gNB-initiated COT(s). The UE may sense the remaining channels that are not occupied by gNB-initiated COT(s), i.e., there are no on-going gNB-initiated COT(s) over the remaining channels. If one or more of the remaining channels are found idle, the UE may initiates COT(s) over the one or more of the remaining channels by transmitting the corresponding grant UL transmission(s). In this example, the UE may have some transmissions in the gNB-initiated COT(s) and some transmissions in the UE-initiated COT(s) in separate channels.

The above embodiments may be viewed as that, for a multi-channel configured grant that coincides with the starting boundaries of UE FFPs, a UE may apply COT ownership rules for each channel, and decide, for each channel, whether the corresponding UL transmission is to be transmitted in a gNB-initiated shared COT or a UE-initiated COT.

For the configured grant UL transmissions over the channels, either transmitted in gNB-initiated shared COT(s) or UE-initiated COT(s), a gNB may send feedback (e.g., acknowledgement/negative acknowledgement (ACK/NACK)) to the UE indicating whether the configured grant UL transmissions have been received successfully by the gNB. The ACK/NACK corresponding to the configured grant UL transmissions may be provided in each of the channels where a UL transmission has been transmitted (i.e., over a gNB-initiated COT channel, or a UE-initiated COT channel), or a subset of the channels where UL transmissions have been successfully decoded by the gNB. In an example, the gNB may only provide ACK/NACK in the gNB-initiated COT channel(s). The gNB may only send a ACK/NACK message corresponding to each UL transmission that was transmitted using a gNB-initiated COT. In another example, the gNB may send a ACK/NACK message corresponding to each UL transmission that was transmitted either using a gNB-initiated COT or a UE-initiated COT. In another example, the gNB may send a ACK/NACK message corresponding to each UL transmission of the configured grant UL transmissions, regardless whether it is transmitted by the UE.

In some embodiments, when the gNB configures UL grants (Type 1/Type 2) for a UE or when the configured grants are activated for the UE via downlink control information (DCI), the gNB may send an indication to the UE, indicating that the UE append, to a UL transmission, a list of channels where the UE performs transmission(s), or a list of channels where the UE initiated COT(s) (also referred to as UE-initiated COT channels). In this way, the gNB may learn a channel where the UE failed to initiate a UE COT because the channel was busy as opposed to the gNB's failure to receive the UL transmission due to a collision of UL transmission, which is possible in unlicensed band. That is, when the gNB does not receive a UL transmission over the channel, the gNB may understand that this is caused by the UE's failure to initiate a UE COT due to the unavailability of the channel, instead of by the gNB's failure to receive the UL transmission due to collision. The UE may append the list of channels in one or more UL transmissions that are transmitted by the UE. Each of the one or more UL transmissions may be transmitted in a gNB-initiated or UE initiated COT.

In some embodiments, the list of channels may be provided in a form of map. For instance, the UE (e.g., based on indication/configuration from a gNB) with the configured transmission(s) may provide a map indicating which channels were used for COT initiation (i.e., the UE has initiated COTs over those channels). The gNB may feedback ACK/NACK on all those channels that the UE indicated as UE-initiated COT channels, even when a UL transmission that was used to initiate a UE COT over a channel (i.e., the UL transmission transmitted at the beginning of a FFP of the initiated UE COT) was not received by the gNB.

In an embodiment, if the UE does not provide such a map or list of channels, for UL transmission(s) using UE-initiated COT(s), the gNB may feedback ACK/NACK only based on received UL transmissions that started UE-initiated COT(s). For example, the UE initiated COTs over channels 1-10 for transmitting respective UL transmissions over the channels, and does not provide information about channels 1-10 to the gNB. As described above, the UE may initiate a COT by transmitting a UL transmission at the beginning of a FFP associated with the COT. Such a UL transmission may be referred to as a UL transmission that starts the UE-initiated COT. The gNB receives UL transmissions that are transmitted by the UE using UE-initiated COT(s) over channels 1-6. The gNB may only feedback ACK/NACK corresponding to the UL transmissions received by the gNB over channels 1-6, without feeding back for channels 7-10. For UL transmissions transmitted using gNB-initiated COTs, the gNB may provide feedback in a conventional way. For example, the UE transmits UL transmissions using gNB-initiated COTs over channels 11-20, the gNB may provide ACK/NACK for each UL transmission of each channel.

The UE may resend the UL transmissions in all channels where NACK feedback was received. The absence of feedback may be interpreted as an acknowledgement.

In an embodiment, when the configured grant Type 2 UL transmission is activated via DCI (also referred to as activating DCI), the DCI may further activate only a subset of the configured grant transmissions and may restrict subset(s) of configured grant transmissions to be done in UE-initiated COT(s) or gNB-initiated COT(s) only even the configured grant coincides with the beginning of UE FFP. The DCI, which is used to active the configured grant Type 2 UL transmissions over multiple channels, may further be configured to only activate a subset of the configured grant Type 2 UL transmissions. The DCI may also include information indicating that one or more UL transmissions of the configured grant Type 2 UL transmissions may only be transmitted using UE-initiated COT(s) or gNB-initiated COT(s).

For instance, the activating DCI may indicate that if there is no ongoing gNB initiated COT, none of the UL transmissions can take place, or only the UE-initiated COT transmissions can take place in all or a subset of the configured UL transmissions.

Figure 4:
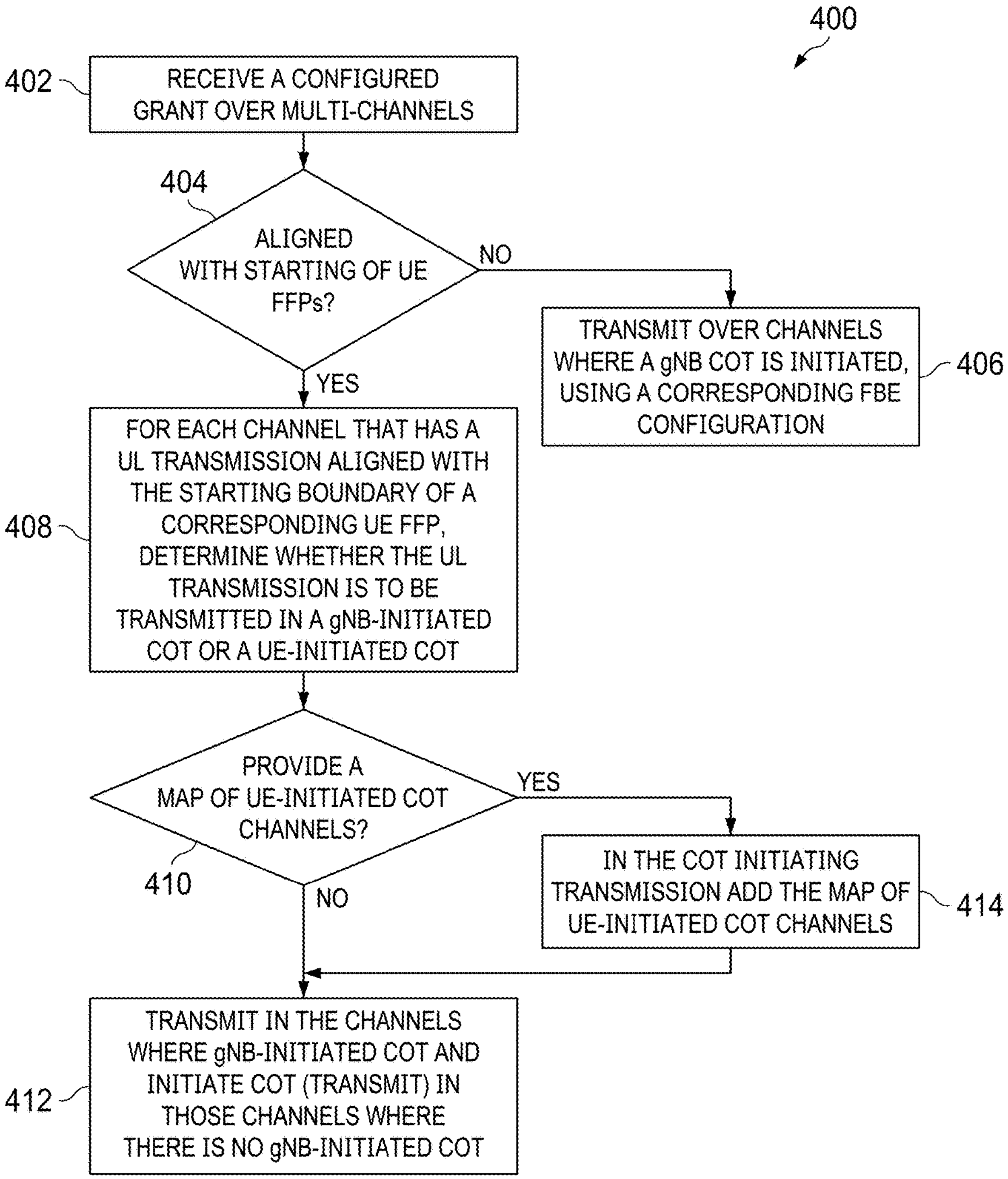
FIG. 4 is a flow diagram of embodiment UE operations for configured UL transmissions over multiple channels.

FIG. 4 is a flow diagram of embodiment UE operations 400 for configured UL transmissions over multiple channels. As shown, a UE receives a configured grant over multi-channels (block 402). The configured grant may be the configured grant Type 1 or Type 2. The configured grant configures UL transmissions over the multi-channels for the UE. The UE may receive the configured grant when receiving the higher layer parameter of configuredGrantConfig including rrc-ConfiguredUplinkGrant for Type 1, or when receiving a UL grant in an activation DCI after reception of the higher layer parameter of configuredGrantConfig not including rrc-ConfiguredUplinkGrant for Type 2.

The UE may determine whether the UL transmissions are aligned with the starting boundary of UE FFPs of the multi-channels (block 404). The UE may determine whether each UL transmission over each channel is aligned with the starting boundary of a UE FFP of the corresponding channel.

If none of the UL transmissions is aligned with the starting boundary of a UE FFP, the UE may only transmit over channels where a gNB COT is initiated, using a corresponding FBE configuration (block 406).

For each channel that has a UL transmission aligned with the starting boundary of a corresponding UE FFP, the UE may determine whether the UL transmission is to be transmitted in a gNB-initiated COT or a UE-initiated COT (block 408). As described above, the UE may determine whether a gNB COT has been initiated that contains the UL transmission (i.e., whether there is an on-going gNB-initiated COT containing the UL transmission) over the channel. If the gNB-initiated COT exists, the UL transmission may be transmitted using the gNB-initiated COT over the channel. If the gNB-initiated COT does not exist, the UL transmission may be transmitted using a UE-initiated COT.

The UE may determine whether to provide a map of UE-initiated COT channels to a gNB (block 410). The UE may determine whether the gNB requests or indicates the UE to provide the map. The gNB may sends a request or an indication to the UE for the map.

If the map is not needed/required by the gNB, the UE may transmit the UL transmissions over the multi-channels using gNB-initiated COT(s) or UE-initiated COT(s) (block 412). If a gNB-initiated COT exists over a channel, the UE transmits a corresponding UL transmission using the gNB-initiated COT over the channel. If a gNB-initiated COT does not exist over a channel and the channel is available, the UE may initiate a COT over the channel by transmitting a corresponding UL transmission at the beginning of a UE FFP associated with the COT. If the channel is busy, the UE may skip transmitting the corresponding UL transmission over the channel.

If the UE determines to provide the map, the UE may add the map in a COT initiating UL transmission of a channel (block 414). The UE may add, for each channel, the map in a UL transmission that is transmitted to initiate a UE COT of the channel. The UE then proceeds to block 412 to transmit the UL transmissions.

Figure 5:
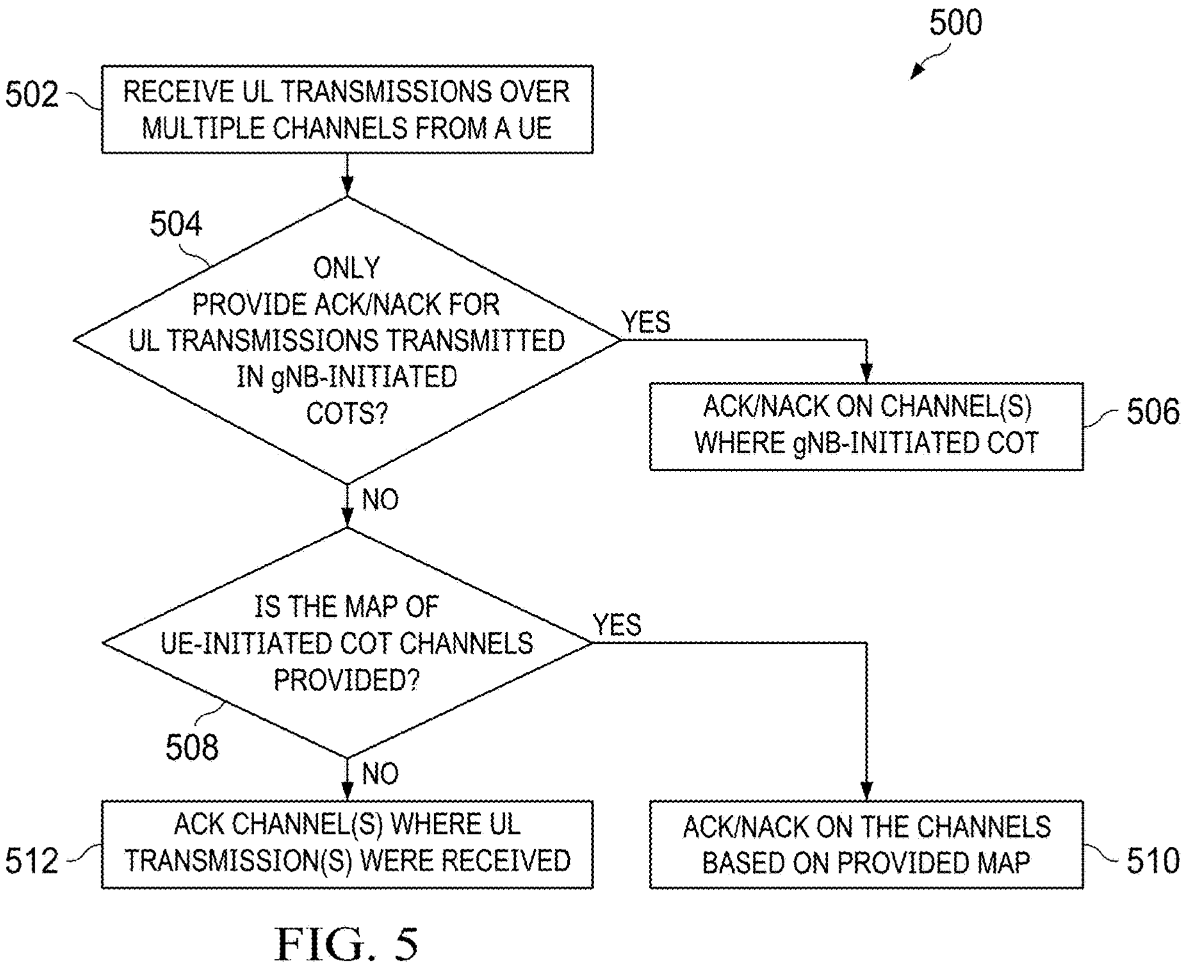
FIG. 5 is a flow diagram of embodiment gNB operations for acknowledging configured UL transmissions over multiple channels.

FIG. 5 is a flow diagram of embodiment gNB operations 500 for acknowledging configured UL transmissions over multiple channels. As shown, a gNB may receive UL transmissions over multiple channels from a UE (block 502). The UL transmission are configured grant Type 1 or Type 2 UL transmissions. Each of the UL transmission may be transmitted in a gNB-initiated COT or a UE-initiated COT.

The gNB may determine whether to provide ACK/NACK only for UL transmissions transmitted in gNB-initiated COTs (block 504). This may be based on a configuration/policy/rule configured for the gNB or for a specific UE.

If the ACK/NACK is only provided for UL transmissions transmitted in gNB-initiated COTs, the gNB sends ACK/NACK for UL transmission(s) transmitted in gNB-initiated COT(s) over corresponding channel(s) (block 506). All the ACK/NACK sent by the gNB are for channel(s) where the gNB has initiated COT(s).

If the answer to block 504 is no, the gNB may determine whether a map of UE-initiated COT channels is provided by the UE (block 508). If the map is provided, the gNB may provide ACK/NACK for UL transmissions in UE-initiated COTs based on the map (block 510). For example, for each of the UE-initiated COT channels included in the map, the gNB may provide a feedback to an UL transmission transmitted over a corresponding channel, to indicate whether the UL transmission is successfully received by the gNB.

If the map is not provided, for UL transmissions transmitted using UE-initiated COTs, the UE may acknowledge over channels where UL transmission(s) in UE-initiated COT(s) were received by the gNB (block 512).

In an embodiment, a gNB may not send the ACK/NACK for a UL transmission, and rather, the gNB may send, or re-send, a DCI control signal for scheduling or CG validation, which indicates that a retransmission is necessary.

It is noted that in NR there is no ACK/NACK from a gNB to a UE. The gNB may just re-schedule a transmission when the transmission is not received (here denoted with NACK), and if the UL transmission is successfully received, there is no action necessary to take.

In an embodiment, a gNB does not send the ACK/NACK for a UL transmission, and rather, the gNB may send, or re-send, a command for scheduling or CG validation, which indicates that a retransmission is necessary. The gNB may use the map (or indication of UE-initiated COT channels) from the UE that corresponds to channels where the UE has initiated a COT, and re-schedule UL transmission(s) on one or more channels where the UE successfully initiated COT (s) and on channel(s) where the gNB initiated COT(s).

In scenarios such as sidelink (e.g., V2X) communications, UL transmissions over multiple channels, over which UE COTs may or may not be initiated, may require explicit ACK/NACK from a receiver to a transmitter. In this case, the embodiment of FIG. 5 may be applied.

One of constraints for wideband UL transmissions may be related to the difference between the LBT bandwidth (BW) and the resources allocated for the UL transmissions. The LBT BW is bandwidth over which the LBT procedure is performed to check/determine channel availability. There are several possible combinations, for example:

- The bandwidth of the resources is greater than the LBT bandwidth
- The bandwidth of the resources is smaller than the LBT bandwidth If the resources allocated overlap with multiple LBT bandwidths (for instance, the resources bandwidth is larger than one or more LBT bandwidths), a condition for transmitting over all these resources may be that the channel is sensed idle via the LBT procedure (CCA) for all the LBT bandwidths. As an example, if UL transmission are configured on one channel, and the channel has a bandwidth spanning/covering two LBT BWs, then two LBT/CCA are needed to determine whether the whole channel is available.

If the resources are fully covered by an LBT bandwidth, the transmission corresponding to the allocated resources may take place if the channel is found unoccupied via the LBT procedure over the LBT bandwidth. As an example, if UL transmissions are configured on three channels, and the LBT BW covers/spans bandwidth of the three channels, then one LBT/CCA is needed to determine whether each of the three channels is available.

In an embodiment, the resources configured or scheduled for wideband UL transmissions may be contiguous, and the UL transmissions may take place if all these resources are found available via the LBT procedure (or CCA) prior to the wideband UL transmissions.

In an embodiment, a UL transmission may take place over a subset of contiguous resources if the subset of resources is found available via the LBT procedure or CCA.

Yet in another embodiment, a UL transmission may take place in a subset of non-contiguous resources if there are guard bands to other resources such that the leakage of power into these other resources is limited or avoided. The other resources in this case refer to resource not allocated to the UE or resources allocated to the UE but found busy during the LBT procedure.

In an embodiment, guard bands between allocated resources for UL transmissions and non-allocated resources may be different in size (BW) from guard bands between allocated resources found available via the LBT procedure (CCA) and allocated resources found unavailable in the LBT (CCA) procedure.

The LBT bandwidth for LBT procedure should cover the guard bands as well.

Figure 6:
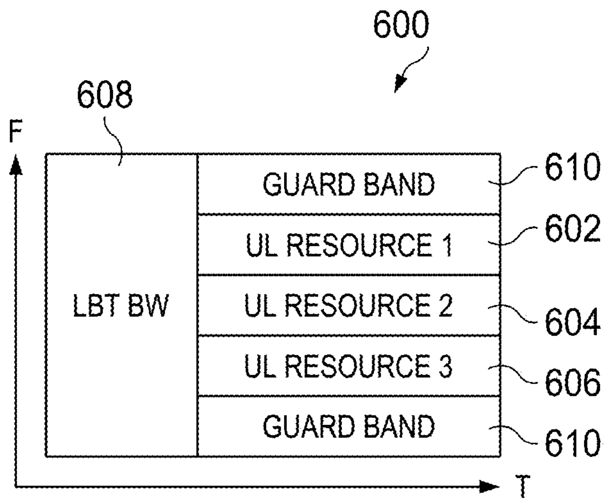
FIG. 6 is a diagram showing example LBT bandwidth, resources allocated for UL transmissions and guard bands.
Figure 7:
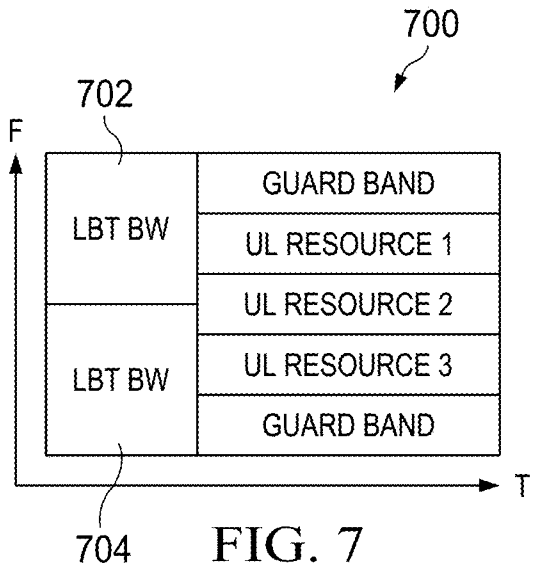
FIG. 7 is another diagram showing example LBT bandwidth, resources allocated for UL transmissions and guard bands.
Figure 8:
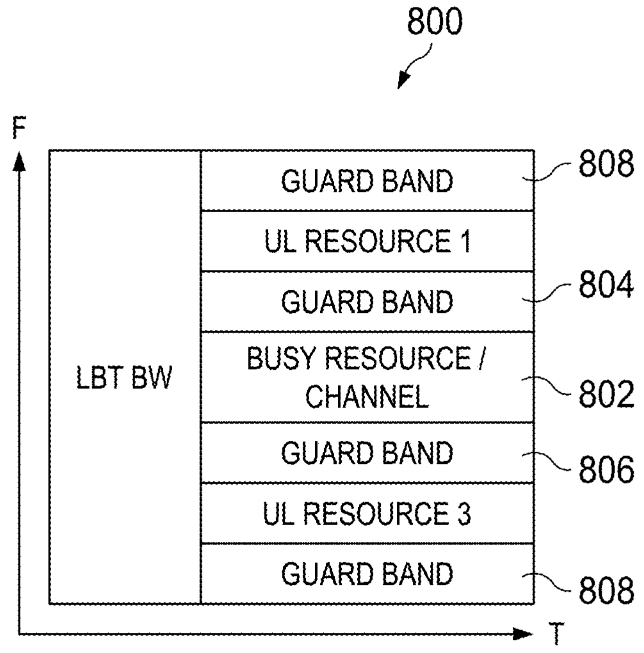
FIG. 8 is yet another diagram showing example LBT bandwidth, resources allocated for UL transmissions and guard bands.

FIGS. 6, 7 and 8 show examples of UL wideband channel access with UE-initiated COT. In these examples, a UE is scheduled via DCI or a configured grant to transmit simultaneously UL transmissions over 3 sets of resources, i.e., UL Resource 1, UL Resource 2 and UL Resource 3. The UL transmissions may be the configured grant Type 1/2 UL transmissions. The UE may transmit the UL transmissions using gNB-initiated COTs or UE-initiated COTs as described previously. FIGS. 6, 7 and 8 are diagrams showing example LBT bandwidths and the 3 sets of UL resources allocated/configured/scheduled for the UL transmissions.

FIG. 6 shows the case when all the 3 sets of UL resources 602, 604 and 606 scheduled/configured are covered by a single LBT BW 608. In other words, the UE can perform a single LBT (CCA) to determine whether the 3 sets of resources 602, 604 and 606 are available for the UL transmissions or not. Guard bands 610 separate the allocated 3 sets of UL resources 602, 604 and 606 from other resources. The LBT BW covers the guard bands as well.

FIG. 7 shows the case when the scheduled 3 sets of resources are larger than a single LBT BW. FIG. 7 shows that the 3 sets of UL resources span two LBT BWs 702 and 704. The UL Resource 1 is covered by the LBT BW 702, and the UL Resource and UL Resource 3 are covered by the LBT BW 704. In this case, the UE needs to perform the LBT (CCA) procedure for all LBT BWs (i.e., the two LBT BWs) that cover each of the UL resources and the guard bands. That is, the UE needs to perform CCA for both LBT BWs 702 and 704 to determine whether the three sets of UL resources are available. Each of the LBT BWs 702 and 704 also covers the guard band that separates the three sets of configured/scheduled UL resources from other resources.

FIG. 8 shows the case when all the 3 sets of UL resources scheduled are covered by a single LBT BW, where the LBT procedure over the LBT BW is executed and a non-contiguous subset of resources is found available. In this example as shown, the UL Resource 2 is found busy, and the UL Resource 1 and UL Resource 3 are available, which makes the available UL resources in the configured/schedule resources non-contiguous. In one embodiment, the UE may transmit the UL transmissions over the non-contiguous set of resources (i.e., UL Resource 1 and UL Resource 3) that are available, given that the necessary guard bands are in place. As shown, UL Resource 802 is found unavailable, and guard bands 804 and 806 are provided to separate the unavailable resource 802 from the available resources (i.e., UL Resource 1 and UL Resource 3). The guard bands 804 and 806 may have different sizes from guard bands 808, which are provided to separate three sets of configured/scheduled UL resources from other resources.

In some embodiments, when a UE is scheduled/granted for UL transmissions (i.e., Type 1/2 transmissions), the UE may be indicated that it can use a UE-initiated COT, a gNB-initiated COT, or hybrid (use either a UE-initiated COT or a gNB-initiated COT) for UL transmission. In some embodiments, the UE may be indicated whether it may use partial resources (e.g., only those found available), or must use all-or-nothing resources. The resources herein refer to frequency resources. When it is indicated that the UE that it must use all-or-nothing resources, if the UE finds that a subset of resources is busy (occupied), it cannot initiate an UL transmission when it is indicated that the UE may use partial resources, the UE may use only a subset of resources that are found available (idle) during LBT or CCA. In another embodiment, the UE may further be indicated that it can use only a subset of contiguous resources when this subset is found idle, or a non-contiguous set of resources (including non-contiguous resources) when each of them is found available.

In a hybrid transmission, i.e., a UE can use either a UE-initiated COT or a gNB-initiated COT) for UL transmissions, the UE may verify that a gNB COT is initiated in a subset of UL resources allocated and transmit in that gNB-initiated COT over that subset, and transmit (if possible) in the remaining UL resources in a UE-initiated COT, where the transmissions take place at the same time. The resources herein refer to frequency resources In an embodiments, a UE may be indicated to have guard bands between resources where UE UL transmissions take place and the adjacent resources (BW).

In an embodiment, energy detection thresholds (EDT) used in the LBT/CCA procedure may be different for guard bands and for resources that will be used for UL transmission.

In an embodiment, an EDT used in LBT (CCA) for a gNB-initiated COT may be different than an EDT used for a UE-initiated COT in a hybrid case. In an example, the EDT used in LBT for resources in the gNB-initiated COT may be indicated by a gNB, while the EDT used in LBT for resources in the UE-initiated COT may be based on the UE transmit power.

Figure 9:
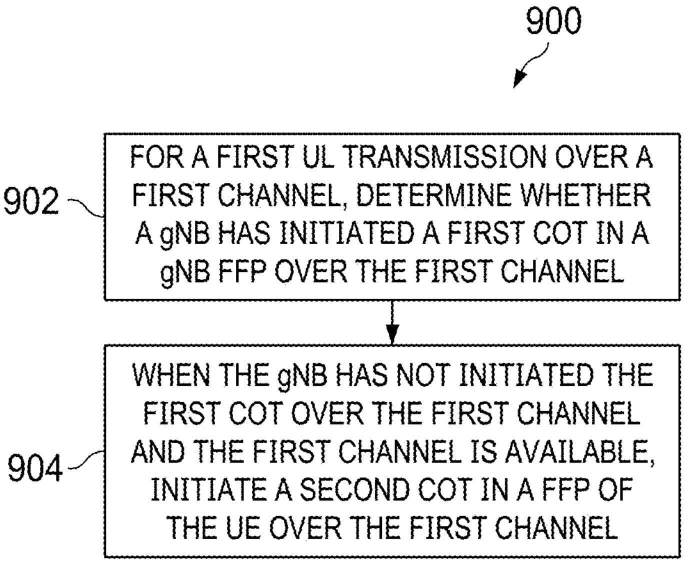
FIG. 9 is a flow diagram of an embodiment method for wireless communications.

FIG. 9 is a flow diagram of an embodiment method 900 for wireless communications. The method 900 may be indicative of example operations by a UE. The UE may be configured or scheduled with a plurality of UL transmissions over a plurality of channels. Each of the plurality of UL transmissions being aligned with a starting boundary of a fixed period frame (FFP) of the UE in a time domain over a channel of the plurality of channels. For each uplink (UL) transmission of the plurality of UL transmissions, the UE may perform the embodiment method 900.

As shown, the UE may determine, for a first UL transmission of the plurality of UL transmissions over a first channel of the plurality of channels, whether a gNB has initiated a first channel occupancy time (COT) in a gNB FFP over the first channel (block 902). The first COT contains the first UL transmission in the time domain. The first COT corresponds to the first UL transmission. When the gNB has not initiated the first COT over the first channel and when the first channel is available, the UE may initiate a second COT in the FFP of the UE over the first channel (block 904). The UE may initiate the second COT in the FFP of the UE by transmitting the first UL transmission over the first channel in the FFP of the UE. The first UL transmission starts at beginning of the FFP of the UE and ends before an idle period within the FFP of the UE.

Figure 10:
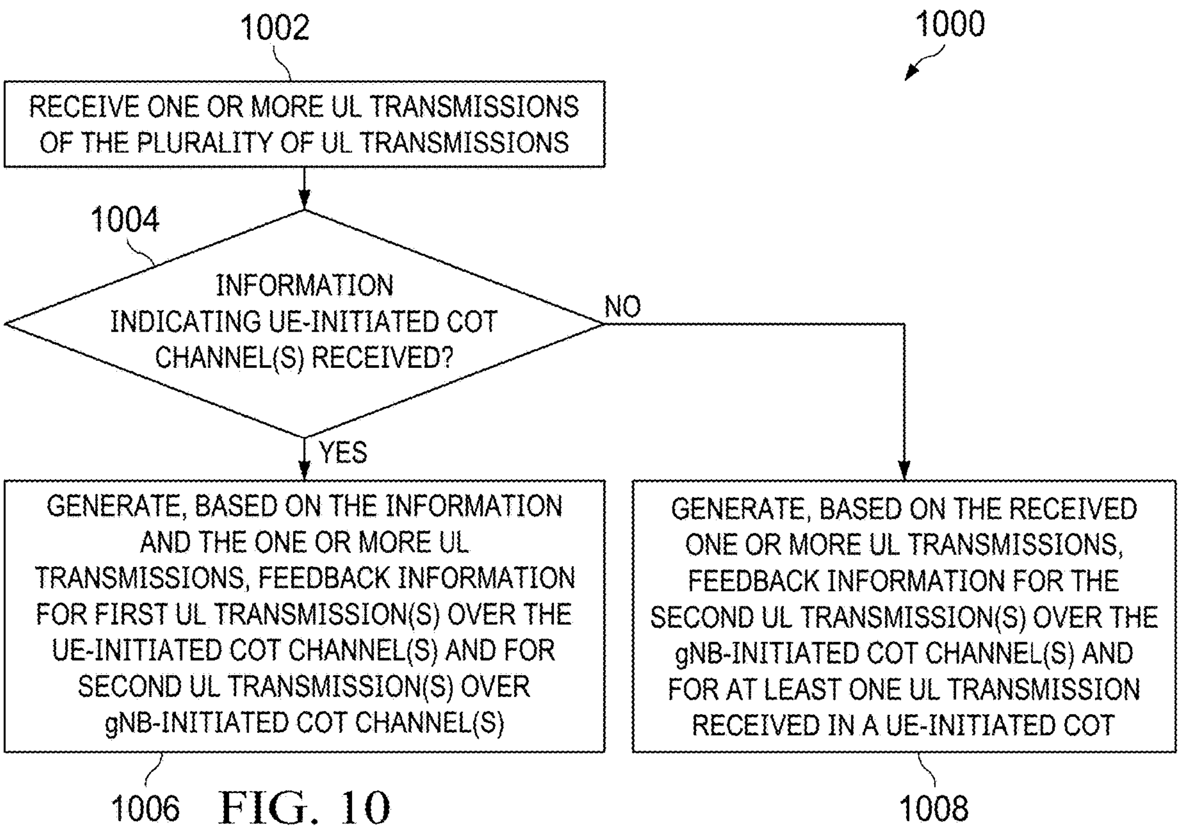
FIG. 10 is a flow diagram of another embodiment method for wireless communications.

FIG. 10 is a flow diagram of an embodiment method 1000 for wireless communications. The method 100 may be indicative of example operations by a gNB. In this example, the gNB may configure or schedule a plurality of UL transmissions over a plurality of channels for a UE. Each of the plurality of UL transmissions being aligned with a starting boundary of a fixed period frame (FFP) of the UE in a time domain over a channel of the plurality of channels. The gNB may perform the embodiment method 1000.

As shown, the gNB may receive one or more UL transmissions of the plurality of UL transmissions (block 1002). At least one UL transmission of the one or more UL transmissions is received in a UE initiated channel occupancy time (COT) over a corresponding channel. The gNB may determine whether information has been received from the UE indicating UE-initiated COT channel(s) of the plurality of channels (block 1004). The UE-initiated COT channel(s) is/are channels over which COT(s) have been initiated by the UE. When the information has been received, the gNB may generate, based on the information and the received one or more UL transmissions, feedback information for first UL transmission(s) over the UE-initiated COT channel(s) and for second UL transmission(s) over gNB-initiated COT channel(s) of the plurality of channels (block 1006). When no information is received, the gNB may generate, based on the received one or more UL transmissions, feedback information for the second UL transmission(s) over the gNB-initiated COT channel(s) and for the at least one UL transmission (block 1008). The feedback information may be ACK/NACK messages indicating whether corresponding UL transmissions are successfully received by the gNB from the UE.

Figure 11:
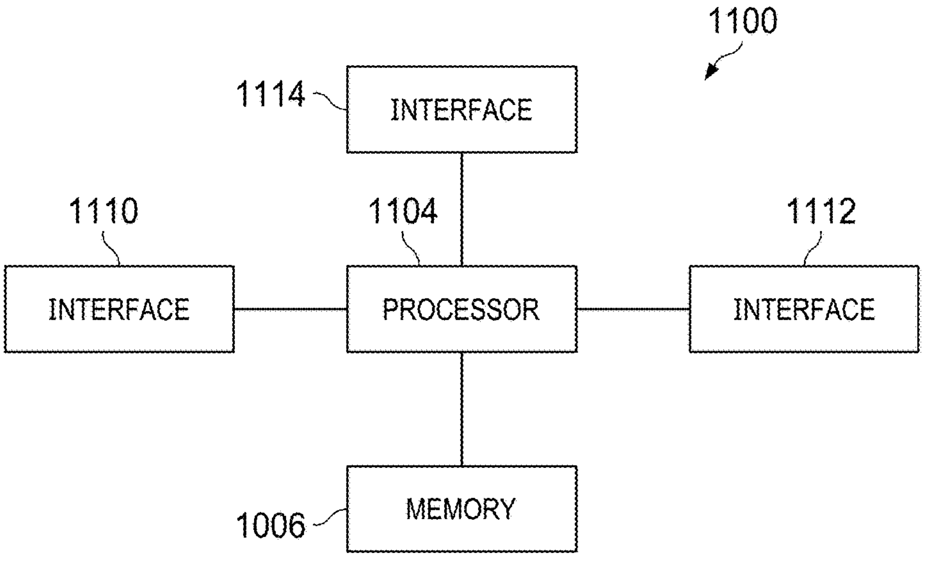
FIG. 11 is a diagram of an embodiment processing system.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
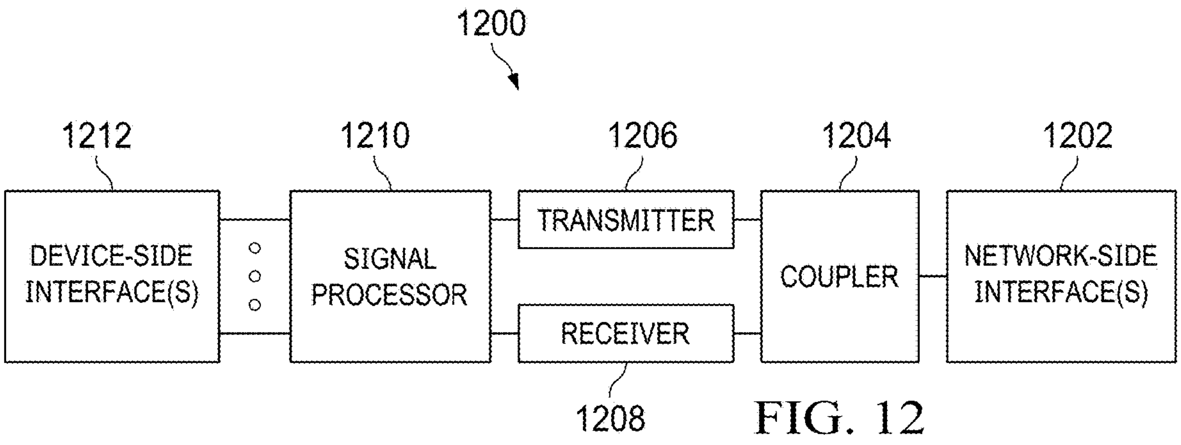
FIG. 12 is a diagram of an embodiment transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a ACK/NACK unit/module, a COT initiating unit/module, a LBT unit/module, a CCA unit/module, configuring unit/module, a grant unit/module, an indicating unit/module, an adding unit/module, a requesting unit/module, and/or a feedback generating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:

determining, by a user equipment (UE) configured with a plurality of uplink (UL) transmissions over a plurality of channels, whether a base station has initiated a first channel occupancy time (COT) over a first channel of the plurality of channels, wherein each of the plurality of UL transmissions is aligned with a starting boundary of a fixed period frame (FFP) of the UE in a time domain over a corresponding channel;

in response to the determining that the base station has not initiated the first COT over the first channel, performing, by the UE, a clear channel assessment (CCA) for determining whether the first channel is available; and initiating, by the UE when determining that the base station has not initiated the first COT over the first channel and when the first channel is available, a second COT over the first channel in the FFP of the UE by transmitting a first UL transmission over the first channel in the FFP of the UE, wherein the first UL transmission starts at a beginning of the FFP of the UE and ends before an idle period within the FFP of the UE.

2. The method of claim 1, wherein the CCA is performed over a listen-before-talk (LBT) bandwidth covering the plurality of channels.

3. The method of claim 1, wherein the CCA is performed over an LBT bandwidth covering the first channel and a guard band.

4. The method of claim 1, wherein the plurality of channels comprises two channels consecutive in a frequency domain.

5. The method of claim 1, wherein the plurality of channels comprises two channels non-consecutive in a frequency domain, wherein the plurality of channels comprises a guard band in between the two channels.

6. The method of claim 1, wherein the plurality of UL transmissions comprises:

configured grant Type 1 UL transmissions, or configured grant Type 2 UL transmissions.

7. The method of claim 1, further comprising:

transmitting, by the UE when the second COT over the first channel is initiated by the UE, an indication indicating that the first UL transmission is transmitted over the first channel using a UE-initiated COT.

8. The method of claim 1, further comprising:

receiving, by the UE, signaling indicating that the UE is allowed to initiate COTs for UL transmissions over the plurality of channels.

9. The method of claim 1, further comprising:

receiving, by the UE from the base station, a feedback message comprising an acknowledgement (ACK) message or a negative acknowledgement (NACK) message, the feedback message corresponding to the first UL transmission transmitted over the first channel during the second COT of the UE.

10. The method of claim 1, further comprising:

transmitting, by the UE, information of a list of channels of the plurality of channels over which at least one transmission of the plurality of UL transmissions has been transmitted using at least one UE-initiated COT.

11. The method of claim 1, further comprising:

receiving, by the UE from the base station, a request requesting report of at least one channel over which at least one UE COT has been initiated by the UE for at least one UL transmission.

12. A method comprising:

receiving, by a base station from a user equipment (UE), one or more uplink (UL) transmissions of a plurality of UL transmissions, the plurality of UL transmissions being configured or scheduled over a plurality of channels, each of the plurality of UL transmissions being aligned with a starting boundary of a UE fixed period frame (FFP) over a channel, and at least one UL transmission of the one or more UL transmissions being received in a UE-initiated channel occupancy time (COT) over a corresponding channel, wherein the UE performs a clear channel assessment (CCA) for determining whether the corresponding channel is available in response to determining that the base station has not initiated a COT over the corresponding channel;

determining, by the base station, whether information has been received from the UE indicating one or more UE-initiated COT channels of the plurality of channels, the one or more UE-initiated COT channels being at least one channel over which at least one COT has been initiated by the UE;

in response to determining that the information has been received from the UE, generating, by the base station based on the information and the one or more UL transmissions, feedback information for one or more first UL transmissions over the one or more UE-initiated COT channels and for one or more second UL transmissions over one or more base station-initiated COT channels of the plurality of channels, wherein the one or more base station-initiated COT channels comprise at least one channel over which at least one COT has been initiated by the base station, and wherein the feedback information indicates whether the one or more first UL transmissions and the one or more second UL transmissions are successfully received by the base station; or in response to determining that the information has not been received, generating, by the base station based on the one or more UL transmissions, second feedback information for the one or more second UL transmissions over the one or more base station-initiated COT channels and the at least one UL transmission.

13. The method of claim 12, wherein the plurality of UL transmissions comprises:

configured grant Type 1 UL transmissions, or configured grant Type 2 UL transmissions.

14. The method of claim 12, further comprising:

determining, by the base station, whether to generate feedback information for at least one UL transmission of at least one of the one or more UE-initiated COT channels, the at least one of the one or more UE-initiated COT channels comprising at least one channel over which at least one UE COT is initiated over the at least one channel.

15. The method of claim 14, further comprising:

when determining not to generate the feedback information for the at least one UL transmission of the at least one of the one or more UE-initiated COT channels, generating, by the base station, only the feedback information for the one or more second UL transmissions over the one or more base station-initiated COT channels of the plurality of channels.

16. The method of claim 12, further comprising:

transmitting, by the base station to the UE, a request requesting the UE to report a list of channels over which at least one UE-initiated COT has been used by the UE for at least a portion of the at least one UL transmission.

17. An apparatus of a user equipment (UE) comprising:

at least one processor; and at least one non-transitory computer readable memory connected to the at least one processor and including computer program code, wherein the computer program code, when executed by the at least one processor, causes the apparatus to:

determine whether a base station has initiated a first channel occupancy time (COT) over a first channel of a plurality of channels, wherein the plurality of channels are configured or granted to the UE for a plurality of uplink (UL)

transmissions, each of the plurality of UL transmissions is aligned with a starting boundary of a fixed period frame (FFP) of the UE in a time domain over a corresponding channel;

in response to determining that the base station has not initiated the first COT over the first channel, perform a clear channel assessment (CCA) for determining whether the first channel is available; and when determining that the base station has not initiated the first COT over the first channel and when the first channel is available, initiate a second COT over the first channel in the FFP of the UE by transmitting a first UL transmission over the first channel in the FFP of the UE, wherein the first UL transmission starts at a beginning of the FFP of the UE and ends before an idle period within the FFP of the UE.

18. An apparatus comprising:

at least one processor; and at least one non-transitory computer readable memory connected to the at least one processor and including computer program code, wherein the computer program code, when executed by the at least one processor, causes the apparatus to:

receive, from a user equipment (UE), one or more uplink (UL) transmissions of a plurality of UL transmissions, the plurality of UL transmissions being configured or scheduled over a plurality of channels, each of the plurality of UL transmissions being aligned with a starting boundary of a UE fixed period frame (FFP) over a channel, and at least one UL transmission of the one or more UL transmissions being received in a UE-initiated channel occupancy time (COT) over a corresponding channel, wherein the UE performs a clear channel assessment (CCA) for determining whether the corresponding channel is available in response to determining that the apparatus has not initiated a COT over the corresponding channel;

determine whether information has been received from the UE indicating one or more UE-initiated COT channels of the plurality of channels, the one or more UE-initiated COT channels being at least one channel over which at least one COT has been initiated by the UE;

in response to determining that the information has been received from the UE, generate, based on the information and the one or more UL transmissions, feedback information for one or more first UL transmissions over the one or more UE-initiated COT channels and for one or more second UL transmissions over one or more base station-initiated COT channels of the plurality of channels, wherein the one or more base station-initiated COT channels comprise at least one channel over which at least one COT has been initiated by a base station, and wherein the feedback information indicates whether the one or more first UL transmissions and the one or more second UL transmissions are successfully received by the base station; or in response to determining that the information has not been received, generate, based on the one or more UL transmissions, second feedback information for the one or more second UL transmissions over the one or more base station-initiated COT channels and the at least one UL transmission.

* * * * *